United States Patent
Danner et al.

(10) Patent No.: US 8,032,577 B2
(45) Date of Patent: *Oct. 4, 2011

(54) APPARATUS AND METHODS FOR PROVIDING NETWORK-BASED INFORMATION SUITABLE FOR AUDIO OUTPUT

(75) Inventors: Ryan A. Danner, Glen Allen, VA (US); Susan H. Barban, Midlothian, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/799,851

(22) Filed: May 3, 2007

(65) Prior Publication Data
US 2007/0213980 A1 Sep. 13, 2007

Related U.S. Application Data

(63) Continuation of application No. 09/592,302, filed on Jun. 12, 2000, now Pat. No. 7,219,136.

(51) Int. Cl.
*G10L 15/00* (2006.01)
(52) U.S. Cl. ........................ 709/200; 379/88.17; 704/231
(58) Field of Classification Search .................. 709/200; 704/231; 379/88.17
See application file for complete search history.

(56) References Cited

U.S. PATENT DOCUMENTS

| | | | |
|---|---|---|---|
| 5,819,260 A * | 10/1998 | Lu et al. | 707/3 |
| 6,185,535 B1 * | 2/2001 | Hedin et al. | 704/270 |
| 6,269,336 B1 * | 7/2001 | Ladd et al. | 704/270 |
| 6,434,547 B1 * | 8/2002 | Mishelevich et al. | 707/3 |
| 6,463,440 B1 * | 10/2002 | Hind et al. | 707/102 |
| 6,476,833 B1 * | 11/2002 | Moshfeghi | 715/854 |
| 6,490,564 B1 | 12/2002 | Dodrill et al. | |
| 6,513,063 B1 * | 1/2003 | Julia et al. | 709/219 |
| 6,574,601 B1 * | 6/2003 | Brown et al. | 704/270.1 |
| 6,589,291 B1 * | 7/2003 | Boag et al. | 715/235 |
| 6,760,884 B1 * | 7/2004 | Vertelney et al. | 715/202 |
| 6,766,298 B1 | 7/2004 | Dodrill et al. | |
| 6,859,776 B1 * | 2/2005 | Cohen et al. | 704/270 |

(Continued)

OTHER PUBLICATIONS

Frank Vahid, "The Softening of Hardware," Computer, vol. 36, No. 4, pp. 27-34, Apr. 2003, doi:10.1109/MC.2003.1193225.*

*Primary Examiner* — Alina N. Boutah
(74) *Attorney, Agent, or Firm* — Hickman Palermo Truong & Becker LLP

(57) ABSTRACT

The invention is directed to techniques for navigating a network based on audio input to retrieve information from a network. A user enters audio commands into a two-way communication device to access information located on a network, such as the Internet. For example, a user enters a voice request for a web page into a telephone, which sends the request to a proxy browser for the World Wide Web which in turn provides the request to a web navigation application executing on an application server. The web navigation application generates a text-based request based on the voice request and retrieves a web page from the World Wide Web based on the text-based request. The web navigation application uses a script or an XML page to generate a file suitable for audio output from the retrieved web page. The web navigation application then produces an audio output file from the generated file, which it sends to the proxy browser to provide audio output signals to the user over the telephony connection to the user's telephone.

22 Claims, 9 Drawing Sheets

U.S. PATENT DOCUMENTS

| | | | |
|---|---|---|---|
| 6,940,953 B1 * | 9/2005 | Eberle et al. | 379/88.13 |
| 6,961,712 B1 * | 11/2005 | Perkowski | 705/26.62 |
| 7,185,049 B1 * | 2/2007 | Benitez et al. | 709/203 |
| 7,502,993 B1 * | 3/2009 | Dodrill et al. | 715/205 |
| 7,571,226 B1 * | 8/2009 | Partovi et al. | 709/224 |
| 2002/0006126 A1 * | 1/2002 | Johnson et al. | 370/356 |
| 2002/0164000 A1 * | 11/2002 | Cohen et al. | 379/88.17 |
| 2005/0135383 A1 * | 6/2005 | Shenefiel | 370/395.52 |
| 2005/0192809 A1 * | 9/2005 | Dodrill et al. | 704/270.1 |
| 2005/0193332 A1 * | 9/2005 | Dodrill et al. | 715/513 |
| 2005/0240620 A1 * | 10/2005 | Danner et al. | 707/102 |
| 2006/0041841 A1 * | 2/2006 | Parasu | 715/513 |
| 2006/0047767 A1 * | 3/2006 | Dodrill et al. | 709/206 |
| 2007/0213980 A1 | 9/2007 | Danner et al. | |

* cited by examiner

```xml
<?xml version="1.0" ?>
<DOCUMENT>
  <MenuVariables name="MenuName"  value="Main Menu"/>
  <MenuVariables name="DefaultPrompt" value="ACT_ACTIONS_PROMPT.wav"/>
  <MenuVariables name="Fallback" value="AUD_MAIN_MENU.xml"/>
  <MenuVariables name="Type"  value="MENU"/>
  <MenuVariables name="InputMask" value="StandardMenu"/>
  <MenuVariables name="Images" value=""/>
  <MenuVariables name="Text"  value="If you want your messages now press 1.
    To send a voice message, press 2, to work with your greetings press 3,
    if you need something else press 0."/>
  <Options name="0"  value="SOUND:ACT_ACTIONS_PROMPT_2.wav"
    text=""/>
  <Options name="1" value="MENU:ACT_GET_VOICE_FAX_EMAIL_MENU.xml"
    text="Access your messages."/>
  <Options name="2" value="MENU:REC_ASK_ADDRESS_MENU.xml"
    text="Send a message."/>
  <Options name="3" value=
    "DECISION:DECISION_DETERMINE_ACTIVE_GREETING.xml"
    text="Greetings."/>
  <Options name="4" value="MENU:LST_ACTIONS_MENU.xml"
    text="Personalize your mailbox."/>
  <Options name="5" value="MENU:IM_GET_NUMBER_MENU.xml"
    text=""/>
  <Options name="6" value="PROC:general_notimp"
    text=""/>
  <Options name="8" value="SOUND:AUD_WAITING.wav"
    text="Wait."/>
  <Options name="9" value="MENU:LST_ACTIONS_MENU.xml"
    text=""/>
  <Options name="*0" value="SOUND:ACT_ACTIONS_HELP_1_NO_SNR.wav,
    ACT_ACTIONS_HELP_2.wav,AUD_COMMON_HELP_1.wav"
    text=""/>
  <Options name="*5" value="DECISION:PASSTHRU_SAYGOODDAY.xml"
    text=""/>
  <Options name="*7" value="PROC:readstock(S|ZZZZ)"
    text="Hear ZZZZ Stock Information"/>
  <Options name="*9" value="DECISION:LOGOUT_GOODBYE.xml"
    text=""/>
</DOCUMENT>
```

FIG. 7

```
                                                   530
                                                    ↓
<? {
   lib_include ("$AXLib/libUMtts.p3l");
   $procstatus = 1;

$symbol = $parameter_ar[1];                                        ⎫
   $stock_url = "http://hostname.somehost.com/stockquote.cgi?$symbol;  ⎬— 532
                                                                      ⎭

$content = file_readintostring ($stock_url)        }— 534 ereg ("Name:(.*\n)", $content, $match_ar);          ⎫
   $name= $match_ar[1];                                 ⎪
   ereg ("Last Trade:[ ]+$([0-9.]{3,9})", $content, $match_ar);  ⎬— 536
   $last_trade = $match_ar[1];                          ⎪
   ereg ("Change:[ ]+[+-]$([0-9.]{3,9})", $content, $match_ar);  ⎪
   $change= $match_ar[1];                              ⎭

$ttsstr = "$name last traded at $last_trade."       ⎫
   if ($change != 0) {                                  ⎪
     if ($change > 0) {                                 ⎪
       $ttsstr .= "Up $change.";                        ⎬—538
     } else {                                           ⎪
       $ttsstr .= "Down $change.";                      ⎪
     }                                                  ⎪
   }                                                   ⎭

$stockwav = tts_stringtowav ($ttsstr);                              ⎫
   $sndlist .= "$PromptDir/NO_PROMPT.wav,$AXScratchData/$stockwav,";   ⎬—540
} ?>
```

554
    <?xml version="1.0"?>
    <DOCUMENT>
552─── <SEARCH>"<H2>Today's Weather</H2>"</SEARCH>

556─── <EXTRACT>NEXT_H2</EXTRACT>

</DOCUMENT>
                        558
```

FIG. 9

APPARATUS AND METHODS FOR PROVIDING NETWORK-BASED INFORMATION SUITABLE FOR AUDIO OUTPUT

CROSS REFERENCE TO RELATED APPLICATIONS

This patent application is a Continuation of U.S. patent application Ser. No. 09/592,302 filed on Jun. 12, 2000 now U.S. Pat. No. 7,219,136, entitled, "APPARATUS AND METHODS FOR PROVIDING NETWORK-BASED INFORMATION SUITABLE FOR AUDIO OUTPUT", the contents and teachings of which are hereby incorporated by reference in their entirety.

BACKGROUND

The evolution of the conventional public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML (Hypertext Markup Language) pages, logic, and database functions. In addition, the web server may provide logging and monitoring capabilities.

In contrast to the public switched telephone network, the open standards-based IP network has enabled the proliferation of web based applications written by web application developers using web development tools. Hence, the ever increasing popularity of conventional web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, conventional telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The prior art web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL (Uniform Resource Locator) from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

While not considered prior art to the present invention, commonly-assigned, copending application Ser. No. 09/480,485, filed Jan. 11, 2000, entitled "Application Server Configured for Dynamically Generating Web Pages for Voice Enabled Web Applications", the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe a user interface, such as dynamic generation of a menu of options or a prompt for a password, an application logic operation, or a function capability such as generating a function call to an external resource. The application server then parses the XML page, and executes the operation described by the XML page, for example, by dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. While not considered prior art to the present invention, commonly assigned, copending application Ser. No. 09/501,516, filed Feb. 1, 2000, entitled "Arrangement for Defining and Processing Voice Enabled Web Applications Using Extensible Markup Language Documents", the disclosure of which is incorporated in its entirety herein by reference, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment.

Hence, the XML document described in the above-incorporated application Ser. No. 09/501,516, which can be written using a conventional editor or word processor, defines the application to be executed by the application server within the runtime environment, enabling voice enabled web applications to be generated and executed without the necessity of programming language environments.

In reference to a conventional telephony-based application (unlike those in the patent applications incorporated by reference above), a user can use the application to access prerecorded responses from a remote source by using a menu-based audio interface. This prior art interface may be based on simple voice predefined voice commands, like "yes" or "no," or reciting a number to indicate choice in a menu. The interface may also be based on entering numbered or other responses on a touch tone keypad into the telephone. For example, a user can use a touch tone telephone to access a bank and obtain the balance or other information on a bank account over a telephone. A user can also use a touch tone telephone to obtain information about some topic or organization they are interested in, such as the hours, exhibits, prices, and special events for a museum, based on a menu of prerecorded menus and messages maintained by the museum.

In other conventional approaches, automatic speech recognition (ASR) techniques provide for the recognition of words or phrases in a user's speech. A user can provide speech input into a microphone attached to a computer, and the computer can translate words and phrases in the speech into commands or data that the computer receives as input similar to the way input typed into a keyboard would be used by the computer. Text to speech (TTS) techniques provide for the output of a computer to be translated from text output to speech. Thus the user can hear the output of the computer that, otherwise, would typically be read by the user from a display screen attached to the computer.

SUMMARY OF THE INVENTION

There are a number of deficiencies with conventional voice-based communications systems. For example, when a user accesses information using a conventional telephony-based application, the user is limited to the predesigned menu provided by the telephony-based application, and is limited to the types and amounts of information that the user can receive. For example, if the user is accessing bank records through a telephony based application, then the user is restricted to retrieving limited pieces of data about the bank account. The user does not have the option of accessing more general types of information, such as web pages available over the Internet, an intranet, or other network that provides other information about the account or the bank. Any attempt to add such an option of accessing web pages using existing telephony-based applications, if possible, would require substantial modifications to the telephony programming by switch vendors. Even if able to access such web pages, the user would require a text display or printer associated with the telephone to read the web pages. Even if the text material in the web page were translated directly into sound, then the user would typically have to listen to a long recital of the text in the web page, constantly attending closely to the recital to pick out the relevant pieces of information that he/she is specifically interested in.

Thus, the user has several needs or desires that are not addressed by conventional systems. There is a need for a solution that provides useful access to a web page or other sets of information over a computer network, such as the Internet, or other network. The user also desires to speak natural language or natural sounding commands into a telephone or other audio communication device in order to access a web page or other set of information, and receive back an audio output that provides only the specific information desired. For example, the user may wish to access a personalized web page that provides stock quotes for stocks that the user owns or is interested in buying. The user desires to speak in a command like "Stock quotes" over a telephone, or other two-way audio communication device, and hear the quotes provided over the telephone. If the user accesses the Internet using their computer to modify their personalized web page by adding a new stock of interest, then, the next time he/she uses the telephone to access the stock quotes on the personalized web page, the user expects to hear the stock quote for the newly added stock, without performing any other customization step for the web-based application providing the stock quotes over the telephone. The user also desires to customize the commands that are spoken into the telephone, such as requesting that a new command be enabled, such as "High tech stock quotes" to provide quotes only on the user's list of selected high technology stocks on the personalized web page.

The techniques of the present invention provide an audio web navigation application executing on a server computer providing audio communication through the application to the Internet. For example, the user is able to speak commands as primitive verbal constructs into the telephone. The application accesses a web page based on the command, filters out or otherwise removes unwanted information, and provides the desired information from the web page to the user, who listens to it over the telephone. The application can be used with a telephone, or other two way audio communication device, such as a mobile phone, Internet phone associated with a computer, or other audio-based device. The application allows the user to customize the commands that he/she enters, as well as tailor the response to particular types of web pages, such as a customized personal web page, or a standard type of web page, such as a stock quote page from a commercial web site, such as the Yahoo!™ web site, www.yahoo.com, provided by Yahoo! Inc., Santa Clara, Calif.

Conventional web browsers, which may be voice driven, often require large and complex software applications and associated databases to perform properly, along with a sufficiently large and powerful computer system to support the applications and databases. For example, a cellular phone or palmtop computer would typically not be able to support such a browser which incorporates such complex technology.

Conversely, the architecture of the invention uses a proxy browser to communicate with the audio web navigation application allows the proxy browser to be comparatively small, efficient and robust in comparison to typical conventional browsers. Using the invention, the user can use small and/or specialized devices, such as an analog telephone or cellular telephone, to communicate through the proxy browser to an audio web navigation application executing on an application server to surf the web reliably and efficiently.

Thus, the audio web navigation application of this invention seamlessly integrates World Wide web navigation using audio and voice technologies. The user is able to use a telephony device of his/her choice and convenience, such as a wireless telephone and connect to the web, navigate, and retrieve information via the device. The user is able to receive normal output from the web, e.g. HTML tags, and then navigate to different web sites using the primitive verbal commands providing for navigation and information retrieval In one embodiment, the invention provides a method for providing information suitable for audio output, including receiving a first set of information over a network based on a request for the first set of information, accessing a tagged document in response to receiving the first set of information, and generating a second set of information suitable for audio output based on the first set of information and the tagged document. For example, the first set of information is a web page received from the World Wide Web. The tagged document can be an XML or other document used to filter the web page to provide a second set of information or generated text page suitable for audio output based on the received web page.

In one embodiment of the invention, the method includes receiving a web page based on a Uniform Resource Locator (URL) request for the web page, accessing an Extensible Markup Language (XML) document, and generating filtered web content suitable for audio output based on the web page and the XML document.

In another embodiment of the invention, the method includes receiving speech information specifying the first set of information, generating a text request for the first set of information based on an acoustic speech recognition (ASR) technique applied to the speech information, and submitting the text request over the network. Another embodiment includes interpreting one or more primitive constructs based on the speech information. A further embodiment includes generating one or more additional primitive constructs based on a request for a user-defined command. An additional embodiment includes applying a case-logic technique to the speech information when generating the text request.

The method includes, in another embodiment, determining an identity of the request for the first set of information, and accessing the tagged document based on the identity of the request. In another embodiment, the identity of the request is based on the identifier for an originator of the request and/or an identifier for a destination of the request.

Another embodiment of the invention includes selecting one or more portions of the first set of information that is suitable for audio output, and generating the second set of information based on selecting the portion of the first set of information.

In an additional embodiment, the method includes generating text data suitable for audio output based on the first set of information and the selected tagged document, and generating audio data based on the text data. Another embodiment of the invention includes generating one or more responses applying a text-to-speech (TTS) technique to the response.

In another embodiment of the invention, accessing the tagged document is performed based on the request for the first set of information and approximately concurrently with the step of receiving the first set of information.

In a further embodiment, each of the first set of information, the tagged document, and the second set of information can be any one or more of a Hypertext Markup Language (HTML) page, an Extensible Markup Language (XML) page, a Virtual Reality Modeling Language (VRML) page, and a Standard Generic Markup Language (SGML) page.

In another embodiment, the invention is directed to a system for providing information suitable for audio output. The system includes a document database and a server including an executable resource. The document database is configured for storing a plurality of tagged documents. The executable resource receives a first set of information over a network based on a request for the first set of information, accesses a tagged document from the document database based on receiving the first set of information, and generates the second set of information suitable for audio output based on the first set of information and the tagged document.

In another embodiment, the first set of information is a web page based on a Uniform Resource Locator (URL) request for the web page, the tagged document is an Extensible Markup Language (XML) document, and the second set of information is filtered web content suitable for audio output based on the web page and the XML document.

In a further embodiment, the executable resource receives speech information specifying the first set of information, generates a text request for the first set of information based on an acoustic speech recognition (ASR) technique applied to the speech information, and submits the text request over the network. In another embodiment of the invention, the executable resource interprets one or more primitive constructs based on the speech information. In a further embodiment, the executable resource generates one or more additional primitive constructs based on a request for a user-defined command. In an additional embodiment, the executable resource applies a case-logic technique to the speech information to generate the text request.

In one embodiment, the executable resource determines an identity of the request for the first set of information, and accesses the tagged document based on the identity of the request. In another embodiment, the identity of the request is based on at least one of an identifier for an originator of the request and an identifier for a destination of the request.

In a further embodiment, the executable resource selects one or more portions of the first set of information that are suitable for audio output, and generates the second set of information based on selecting one or more portions of the first set of information.

In one embodiment, the executable resource generates text data suitable for audio output based on the first set of information and the selected tagged document, and the executable resource generates audio data based on the text data. In an additional embodiment, the text data comprises one or more responses, and the executable resource applies a text-to-speech (TTS) technique to the response to generate the audio data.

In another embodiment, the executable resource, in an approximately concurrent time frame, accesses the tagged document based on the request for the first set of information, and receives the first set of information.

In a further embodiment, each of the first set of information, the tagged document, and the second set of information one or more of a Hypertext Markup Language (HTML) page, an Extensible Markup Language (XML) page, a Virtual Reality Modeling Language (VRML) page, and/or a Standard Generic Markup Language (SGML) page.

In another embodiment, a computer program product includes a computer readable medium having instructions stored thereon for providing information suitable for audio output. The instructions, when carried out by a computer, cause the computer to perform any and/or all of the operations disclosed herein as the invention. For example, in one embodiment, the instructions cause the computer to receive a first set of information over a network based on a request for the first set of information, select a tagged document in response to receiving the first set of information, and generate a second set of information suitable for audio output based on the first set of information and the tagged document. In another embodiment, the instructions of the computer program product include receiving a web page based on a Uniform Resource Locator (URL) request for the web page, accessing an Extensible Markup Language (XML) document, and generating a filtered web content suitable for audio output based on the first page and the XML document.

In a further embodiment, a computer program propagated signal product is embodied in a propagated medium, having instructions for providing information suitable for audio output. The instructions, when carried out by a computer, cause the computer to perform any and/or all of the operations disclosed herein as the invention. For example, in one embodiment, the instructions cause the computer to receive a first set of information over a network based on a request for the first set of information, select a tagged document in response to receiving the first set of information, and generate a second set of information suitable for audio output based on the first set of information and the tagged document. In another embodiment, the instructions of computer program propagated signal product include receiving a web page based on a Uniform Resource Locator (URL) request for the web page, accessing an Extensible Markup Language (XML) document, and generating filtered web content suitable for audio output based on the first page and the XML document.

In another embodiment, a system for providing information suitable for audio output includes a document database and means for producing a second set of information suitable for audio output. The document database is configured for storing a plurality of tagged document pages. The means for producing a second set of information suitable for audio output receives a first set of information over a network based on a request for the first set of information, accesses a tagged document from the document database based on receiving the first set of information, and generates the second set of information suitable for audio output based on the first set of information and the tagged document. In another embodiment, the first set of information is a web page based on a Uniform Resource Locator (URL) request for the web page, the tagged document is an Extensible Markup Language (XML) document, and the second set of information is filtered web content suitable for audio output based on the first page and the XML document.

In one embodiment, the invention is a method for navigating a web by voice in a server configured for executing voice web applications. The method includes requesting a web page based on a voice web navigation request, receiving a retrieved web page based on the voice web navigation request, accessing an extensible markup language (XML) page in response to receiving the retrieved web page, generating filtered web content suitable for audio output based on the retrieved web page and the XML page by the server, and generating the one or more audio output files based on the filtered web content.

The method includes, in another embodiment, receiving speech information specifying the web page, generating a text request for the web page based on an acoustic speech recognition (ASR) technique applied to the speech information, and submitting the text request over the network.

Another embodiment includes determining an identity of the voice web navigation request for the web page, and accessing the extensible markup language page based on the identity of the voice web navigation request.

In a further embodiment, the method includes generating text data suitable for audio output based on the retrieved web page and the extensible markup language document, and generating audio data based on the text data.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a diagram illustrating an example XML page providing a menu to the user of the audio web navigation application according to one embodiment of the invention.

FIG. 8. is a diagram illustrating, as an example only, a script that extracts text for a stock quote from a web page and produces one or more audio output files, used in conjunction with the XML menu page shown in FIG. 7.

FIG. 9 is a diagram illustrating an example of a filtering XML page providing parameters used to extract text suitable for audio output from an HTML page according to one embodiment of the invention.

DETAILED DESCRIPTION

The invention is directed to techniques for navigating the web by voice or other audio input (e.g. DMTF tones) to retrieve information from the web. A user enters audio commands into a two-way audio communication device to access information located on a network, such as speaking commands into a telephone to access a web page over the Internet. A web application configured according to the techniques of the invention executes on a server computer. The application receives the audio request for information from the user, uses this request to access a web page over a network, such as the Internet, an intranet within an organization, an HTTP protocol based network, or other network. The application retrieves a set of information, such as a web or HTML page based on the user's request. The application maintains and stores tagged document pages, such as XML pages, to use when processing a retrieved web page for a user. The application accesses a tagged document page appropriate to use with the retrieved web page. The application then generates a converted web page suitable for audio output based on the retrieved web page and the selected tagged document page. The application supplies the converted web page to an intermediary, such as a proxy browser, that provides audio output signals based on the converted web page over a telephony or other connection to the user who hears the audio output based on the converted web page from the telephone or other two-way audio communication device. In this manner, a user can access (e.g. surf) a network, such as the Internet, using devices (e.g. telephones, cellular phones) that were not conventionally intended for such purposes.

Figure 1:
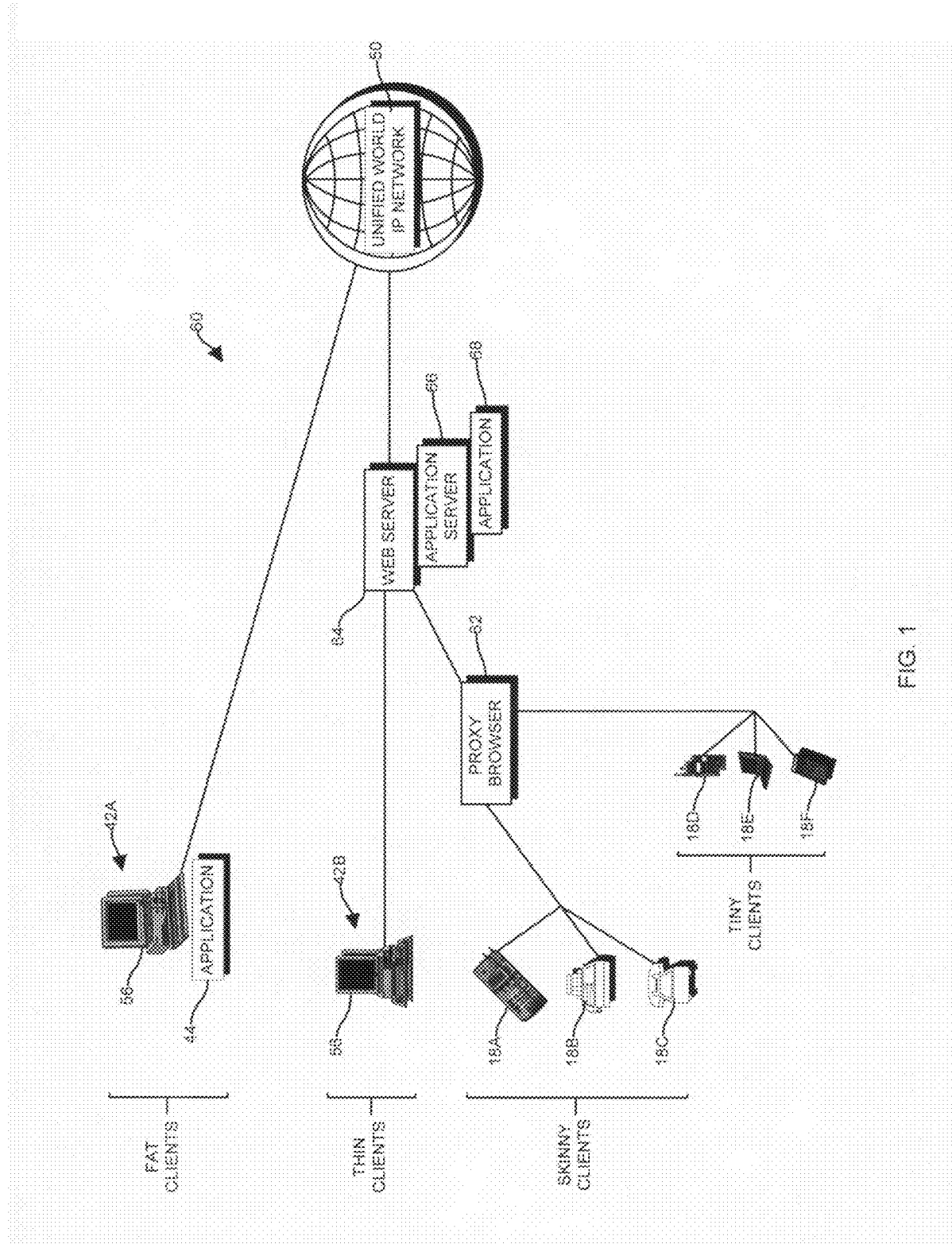
FIG. 1 is a block diagram illustrating a paradigm that enables unified voice messaging services and data services to be provided via an IP network using browser audio control according to an embodiment of the present invention.
Figure 2:
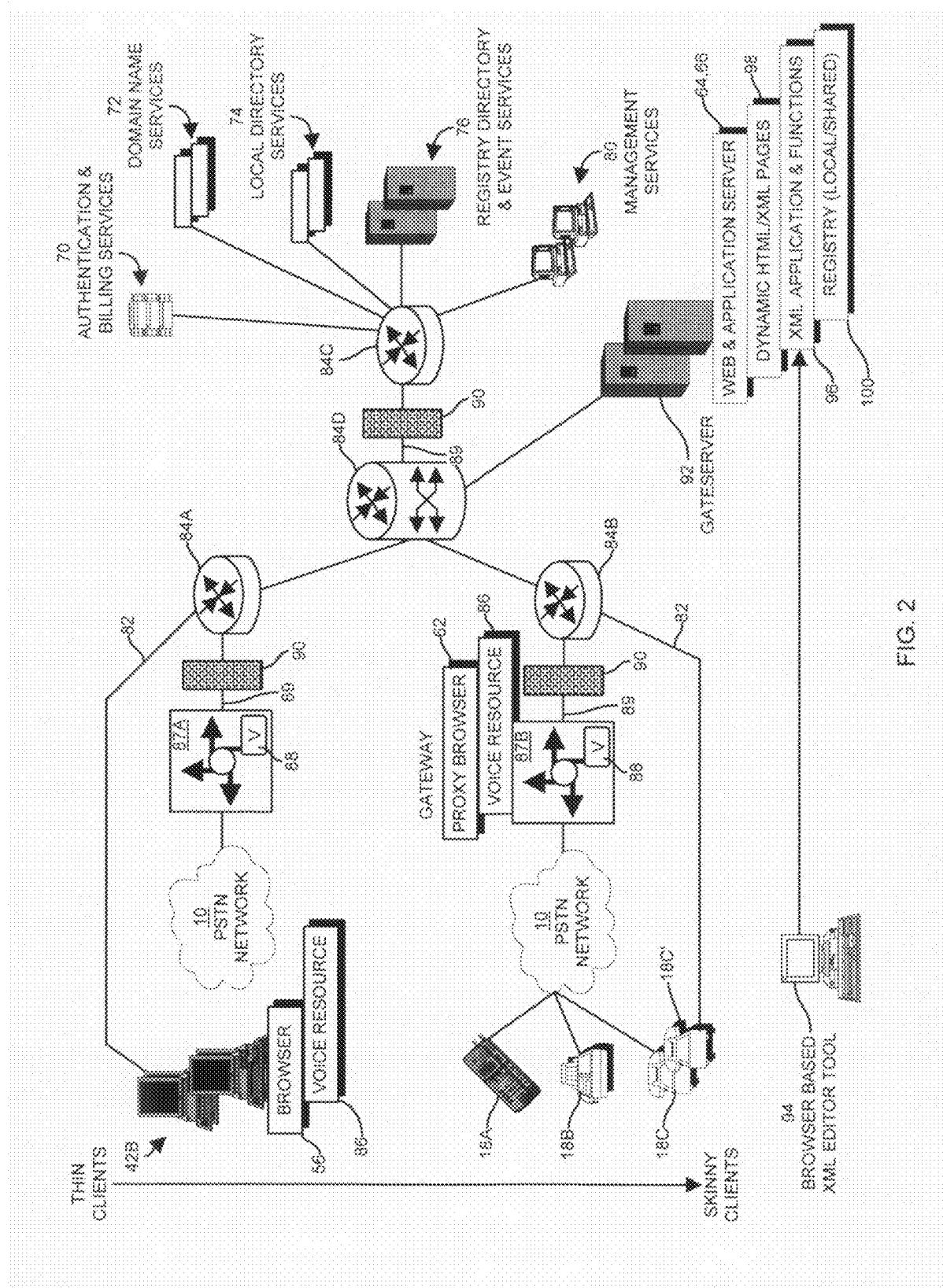
FIG. 2 is a diagram illustrating in further detail implementation of audio applications on the IP network of FIG. 1 according to an embodiment of the present invention.
Figure 3:
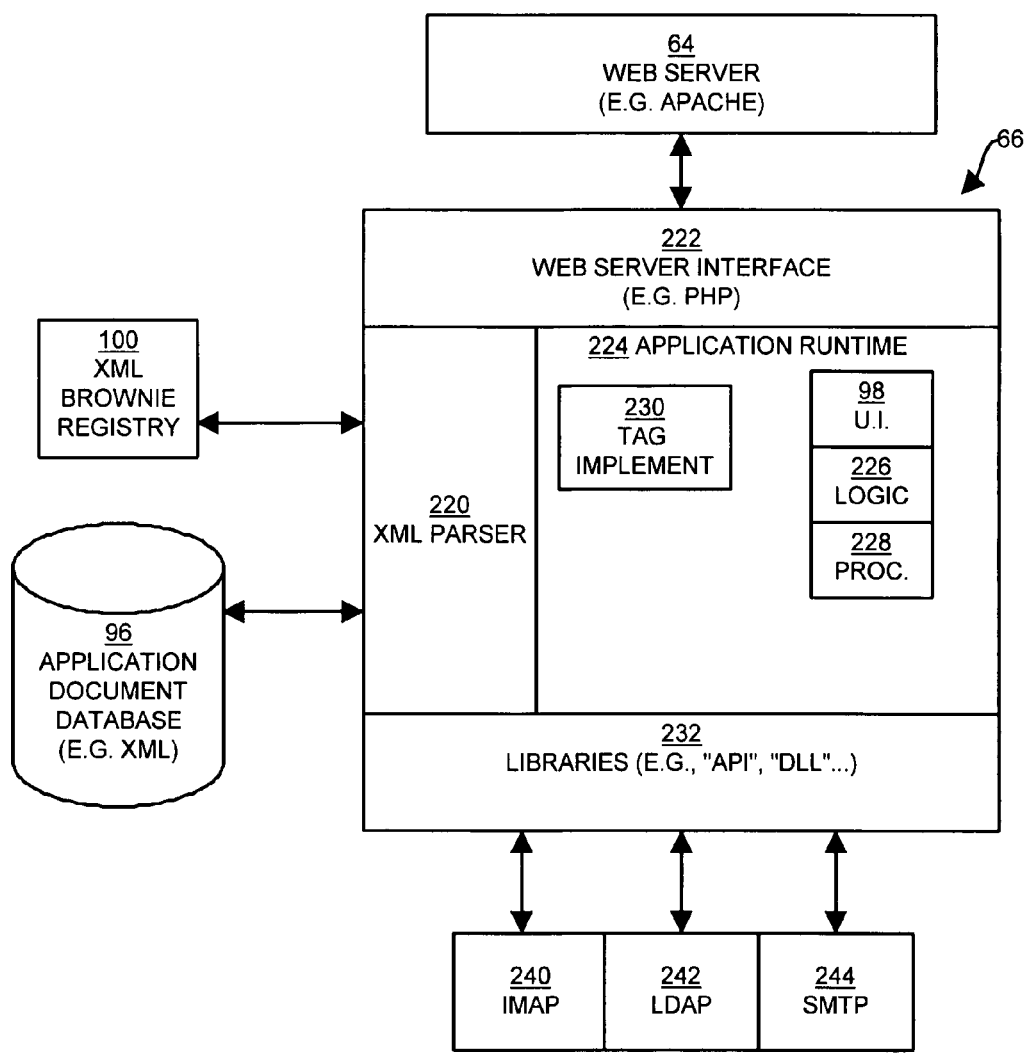
FIG. 3 is a diagram illustrating in detail the application server of FIG. 2 according to an embodiment of the present invention.

FIGS. 1, 2, and 3 are diagrams illustrating an example of the environment in which the invention can be implemented.

FIG. 1 is a block diagram illustrating a unified communications architecture 60 that provides unified voice messaging services and data services via an IP network using browser audio control according to an embodiment of the present invention, based on FIG. 1 of the above-incorporated application Ser. No. 09/501,516. FIG. 1 illustrates clients 42 (shown individually as 42a and 42b), a unified world IP (Internet Protocol) network 50, skinny and tiny clients 18 (shown individually as skinny clients 18a, 18b, and 18c, and tiny clients 18d, 18e, and 18f), proxy browser 62, web server 64, application server 66, and application environment 68. The fat client 42a includes a browser 56 and a local application 44 running on the fat client 42a and providing services to the fat client 42a. The fat client 42b includes a browser 56.

The clients 42a and 42b, referred to herein as Afat clients≡ and Athin clients≡, respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser 56, which, in this case, can use IP protocols such as HTTP to receive and display web pages generated according to hypertext markup language (HTML) from server locations based on uniform resource locators (URL's) input by the user of the PC.

As shown in FIG. 1, each of the clients (tiny clients 18d, 18e, 18f; skinny clients 18a, 18b, 18c; thin clients 42b; and fat clients 42a) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients," defined as devices that are able to interface with a user to provide voice and/or data services (e.g., via a modem) but cannot perform any direct control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c receive analog audio signals played by the proxy browser 62 and no text information (unless a display is available); the fax machine 18b and pager 18f only receive data/text information, and the cellular telephone 18d and the handheld computing device 18e receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers 56, 62 and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new HTML pages having XML tags during runtime and supply the generated HTML pages having XML tags to the web server 64. Since multiple transactions may occur between the browser 56 or 62 and the application server 66, the application server 66 is configured to store, for each existing user session, a data record, referred to as a "brownie," that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 62.

Figure 4:
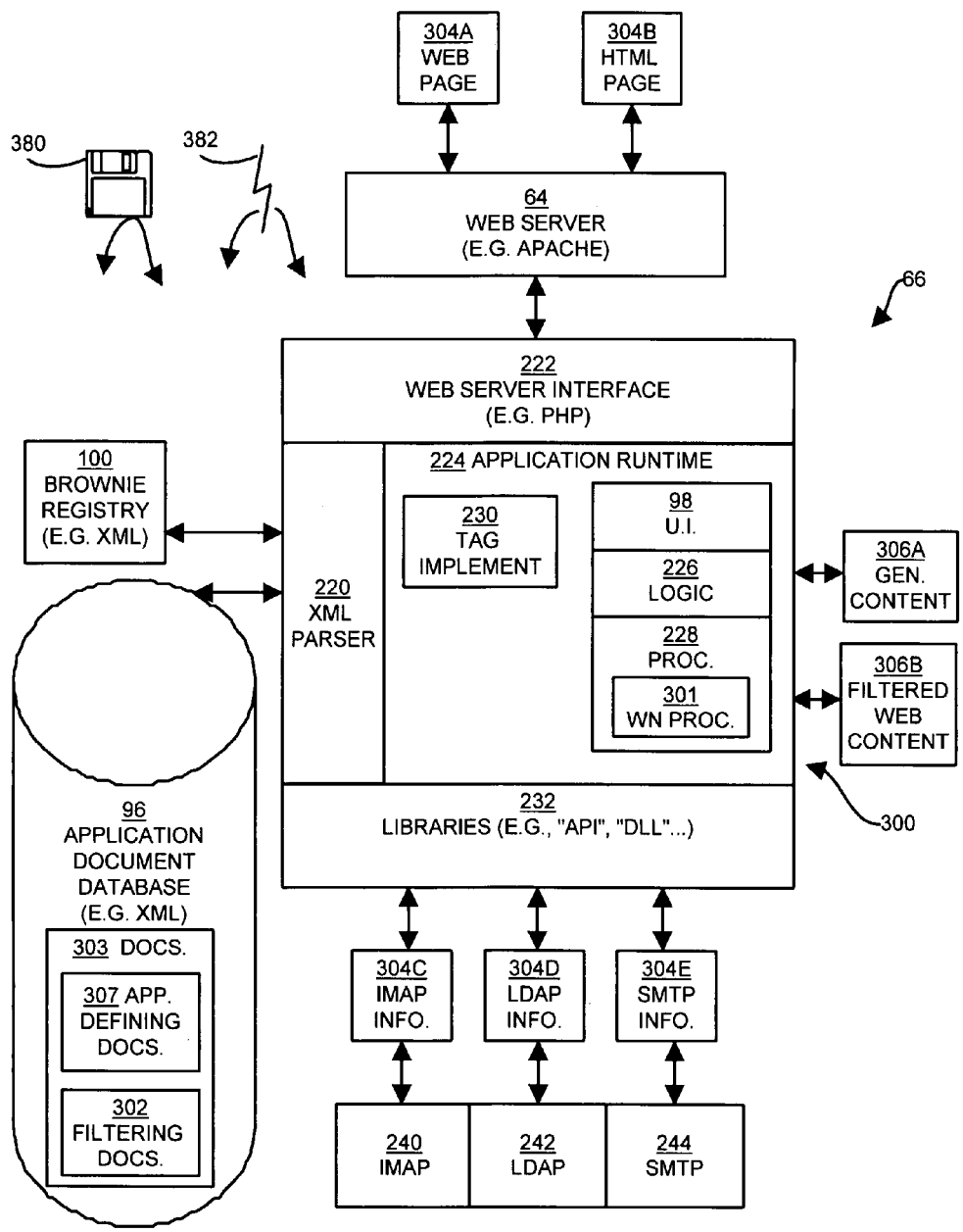
FIG. 4. is a diagram illustrating an example of an audio web navigation application, associated with an example of the application server shown in FIG. 3, further including an executable resource in the application run-time and document pages in the application document database.

FIG. 2 is a diagram that illustrates in further detail the network 60 of FIG. 1, based on FIG. 4 of the above-incorporated application Ser. No. 09/480,485. As shown in FIG. 2, the arrangement of providing browser audio control for voice enabled web applications by the web server 64 and the application server 66 enables voice application services to be implemented in a web server paradigm for many different telephony services, including authentication and billing services 70, domain name services 72, local directory services 74, registry directory and event services 76, and management services 80.

In addition to FIG. 1, FIG. 2 includes PSTN 10, voice resources 86, IP (Internet Protocol) connections 82, routers 84*a*, 84*b*, 84*c*, 84*d*, IP gateway 87*a*, 87*b*, voice over IP interface 88, HTTP connections 89, firewalls 90, gateserver 92, a browser based XML editor tool 94, XML applications and functions 96, dynamic HTML/XML pages 98, and a registry 100. FIG. 2 also illustrates in further detail the browser and web application server interaction. In particular, the thin clients 42*b* (and fat clients 42*a*) may be configured for accessing the web server 64 via a direct IP connection 82 to a router 84. The thin client 42*b* can directly access the web server 64 for voice enabled web application services if the thin client 42*b* has a browser 56 and an executable voice resource 86, for example an executable XML aware plug-in resource, or a Java applet embedded within a received HTML page. Alternatively, the thin client 42*b* may access the web server 64 via the public switched telephone network 10, where an IP gateway 87*a* includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87*b*. The IP gateway 87*b* includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18*c*' is an IP telephone, then it can access the server 64 via an IP connection 82; in this case, the browser internal to the IP telephone 18*c*' processes only audio functions, and ignores any tags associated with text or image content.

As shown FIG. 2, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a document database accessible by the application server 66. The XML pages stored within the XML application and functions database 96 may be stored as static pages to be fetched by the web server 64 and supplied to a browser, however the XML pages may also define the actual application to be executed by the application server 66 in runtime.

According to the disclosed embodiment, the browsers 56 and 62 provide audio control for voice enabled web applications based on the HTML-XML pages supplied by the application server 66 to the web server 64 for transport across an HTTP connection.

The application server 66 executes stored XML applications, also referred to generally as a web applications, in response to HTML requests from the user. In particular, four types of XML documents are used by the application server 66 to execute web applications: menu documents, activity documents, decision documents, and "brownies". The menu documents, activity documents, and decision documents are XML documents that define user interface and boolean-type application logic for a web application, hence are considered "executable" by the application server 66. The brownie document is an XML data record used to specify application state and user attribute information for a given XML application during a user session. During execution of the stored XML applications, the application server 66 stores the 'brownie' in a registry 100.

Hence, the XML documents define user interface logistics and tie services and application server events together in a meaningful way, forming a coherent application or sets of applications. Additional details regarding the definition of executable voice applications using XML documents are described in the above-incorporated application Ser. No. 09/501,516.

FIG. 3 is a diagram illustrating in detail the application server 66 according to an embodiment of the present invention, based on FIG. 8 of the above-incorporated application Ser. No. 09/480,485. The application server 66 is implemented as a server executing a PHP hypertext processor with XML parsing and processing capabilities, available open source at a web site currently having an address of "php.net" at the date of the filing of this application. As shown in FIG. 3, the server system 66 includes an XML parser 220 configured for parsing the application-defining XML documents stored in the XML document database 96, or the XML documents (i.e., "brownies") stored in the registry 100 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache web servers.

The application server 66 also includes a runtime environment 224 for execution of the parsed XML documents. As described above, the runtime environment 224 may selectively execute any one of user interface operation 98, a logic operation 226, or a procedure call 228 as specified by the parsed XML document. In particular, the application runtime environment 224 includes a tag implementation module 230 that implements the XML tags parsed by the XML parser 220. The tag implementation module 230 performs relatively low-level operations, for example dynamically generating an XML menu page in response to detecting a menu tag, performing a logical operation in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 232 that may be implemented as dynamically linked libraries (DLLs) or application programming interface (API) libraries.

The libraries 232 enable the runtime environment 224 to implement the procedures 228 as specified by the appropriate XML document. For example, the application server 66 may issue a function call to one of a plurality of IP protocol compliant remote resources 240, 242, or 244 according to protocols based on IMAP (Internet Message Access Protocol), LDAP (Lightweight Directory Access Protocol), or SMTP (Simple Mail Transfer Protocol), respectively. For example, the PHP hypertext processor includes executable routines capable of accessing the IMAP or LDAP services. Note that the mechanisms for accessing the services 240, 242, or 244 should be established within the application server 66 before use of XML documents that reference those services.

FIG. 4 is a block diagram illustrating an example of an audio web navigation application 300 associated with an application server 66, according to one embodiment of the invention. In addition to what is illustrated in FIG. 3, FIG. 4 shows the audio web navigation application or executable resource 300 in the application runtime 224 and the application document database 96. The web navigation application 300 includes one or more procedures (shown, for example, as procedures 228 and web navigation procedures 301) and one or more tagged documents 303 stored in the application document database 96. In one embodiment, the tagged documents 303 are text documents with tags that identify portions of the text or provide information, such as formatting and/or other types of information, related to the tagged portion of text. The tagged documents 303 include, for example, content filtering documents 302 and application-defining documents 307 (e.g. menu/decision documents). In other embodiments, the web navigation application 300 accesses one or more other databases (not shown in FIG. 4) associated with the application server 66 or available over a network. FIG. 4 also illustrates a first set of information 304 (shown, for example, as retrieved web page 304a, first HTML page 304b, IMAP information 304c, LDAP information 304d, or SMTP information 304e), and a second set of information 306 (shown, for example, as generated content 306a or filtered web content 306b). The web navigation application or executable resource 300 includes one or more programs, scripts, procedures, routines, objects, and/or other software entities, such as tagged documents 303. The filtering documents 302 are document pages used to produce the second set of information 306, such as the generated content 306a. In one embodiment, the document pages 303 are Extensible Markup Language (XML) pages, Virtual Reality Modeling Language (VRML) pages, Standard Generic Markup Language (SGML) pages, and/or other tagged documents. The first set of information 304, in one example, is a web page retrieved from an IP (Internet Protocol) network 50, such as an HTML (Hypertext Markup Language), XML, VRML, or SGML page retrieved from the Internet. In one embodiment, the second set of information 30 is a page of text or other data suitable for conversion to audio output to be transmitted over a connection to an audio communication device used by the user.

In one embodiment, an audio communications device, such as a telephony device cordless telephone 18a, fax machine having an attached telephone 18b, analog telephone 18c, cellular telephone 18d or other device, connects to a proxy browser 62 via the IP gateway 87 and the PSTN 10. Upon activation (e.g. the arrival of a telephone call), the proxy browser 62 makes an initial request to the application server 66. The application server 66 prepares a response to this request based on one or more application-defining documents 307 (e.g. XML menu and decision pages) stored in the document database 96. The response to the initial request may include directives to play a list of audio media specified by the application server 66 and the selected application-defining documents 307. The list of audio media represents a list of user-selectable URL's. In one example, the application server 66 generates an HTML page based on the request and based on the selected application-defining documents 307 that includes the audio media content (e.g. user-selectable URL's) and control information (e.g. defined by XML tags). Based on parsing the HTML page that is output by the application server 66, the proxy browser 62 plays the audible list of URL's to a user of a cellular telephone, and the user requests one of the URL's via a voice or DTMF (discrete multitone frequency) command. The proxy browser 62 then waits for audio input from the user of the audio communications device. Upon receiving that input, the proxy browser 62 sends a new request to the application server 66.

Thus, the proxy browser 62 obtains a request to access a web site via a URL request or otherwise navigate the web. The proxy browser 62 then sends the selection request to the application server 66. In alternate embodiments, the proxy browser 62 or the application server 66 translates the audio request from the telephony device into a text request to navigate the web. Then the application server 66 uses an application-defining document 307 to interpret the selection request and execute a web navigation procedure 301 in the application runtime 224 to obtain a retrieved web page 304a based on a request, using the web server interface 222 and the web server 64 The application server 66 relies on the application-defining document 307 (e.g. menu/decision XML page) to access a document 302 (e.g. web content filtering XML page) from the application document database 96. For example, when requesting a web page 304a, the user has selected a menu option requesting the web page 304a, and that menu option in the application-defining document 307 specifies a procedure 301 with an input parameter for a specific filtering document page 302 used by the procedure 301 in filtering the retrieved web page 304a to produce the filtered web content 306b. The application server 66 then translates the filtered web content 306a into one or more audio output files and sends the audio output files to the proxy browser 62 for playback of the audio files to be transmitted as audio output signals sent to the telephony device. In one embodiment, the application server 66 includes the audio output files, along with XML control tags, in an HTML document output from the application server 66 and sent to the proxy browser for playback of the audio files.

In one embodiment, a computer program product 380 including a computer readable medium (e.g. one or more CDROM's, diskettes, tapes, etc.) provides software instructions for the web navigation application 300. The computer program product 80 can be installed by any suitable software installation procedure, as is well known in the art. In another embodiment, the software instructions for the web navigation application 300 can also be downloaded over a wireless connection. A computer program propagated signal product 382 embodied on a propagated signal on a propagation medium (e.g. a radio wave, an infrared wave, a laser wave, sound wave, or an electrical wave propagated over the Internet or other network) provides software instructions for the web navigation application 300. In alternate versions, the propagated signal is an analog carrier wave or a digital signal carried on the propagated medium. For example, the propagated signal can be a digital signal propagated over the Internet or other network. In one embodiment, the propagated signal is a signal that is transmitted over the propagation medium over a period of time, such as the instructions for a software application sent in packets over a network over a period of seconds, minutes, or longer.

Figure 5:
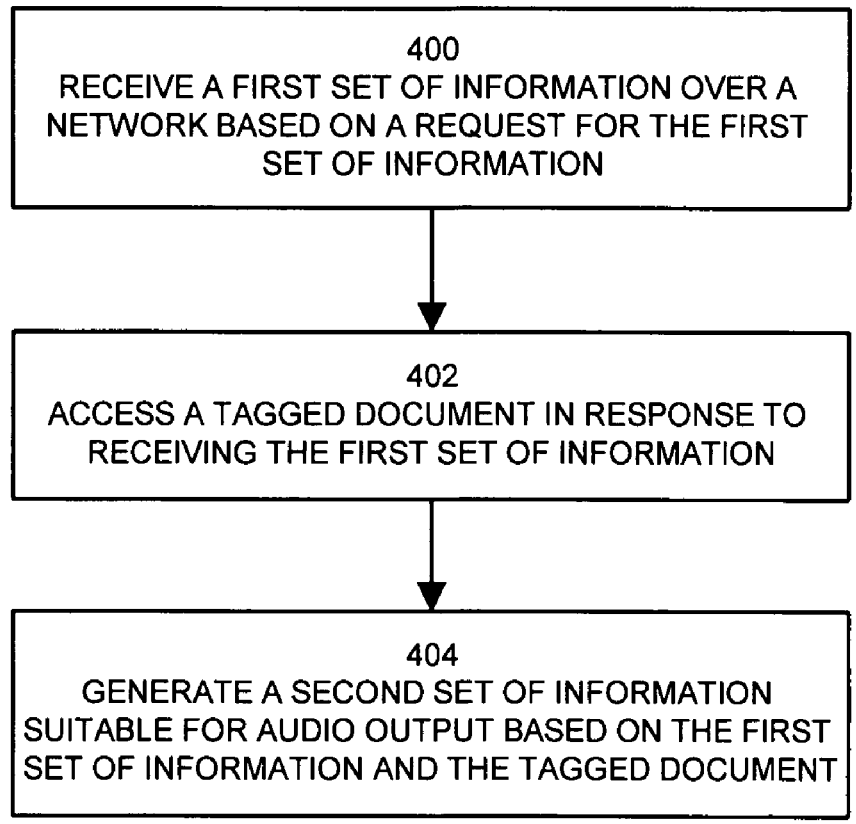
FIG. 5 is a flow chart of a process for providing information suitable for audio output over a network, according to one embodiment of the invention.

FIG. 5 is a flow chart of a process for providing information suitable for audio output over a network, according to one embodiment of the invention. A web navigation application 300, executing on the application server 66, receives the first set of information 304 over a network based on a request for the first set of information 304 (step 400). For example, the web navigation application 300 requests the first set of information 304 by issuing a procedure call (e.g. to an API in the library 232) to post the requested URL to the web server 64. In alternate embodiments, the request is an audio-based request, a voice-based request, or speech information specifying a first set of information. The web navigation application 300 uses an application-defining document 307 to access a document page 302 in response to receiving the first set of information (step 402). The document page 302 is one that is suitable for use in converting the first set of information 304 into a second set of information 306 that is suitable for conversion to audio output. The web navigation application 300 then generates a second set of information 306 suitable for audio output based on the first set of information 304 and the document page 302 (step 404). For example, the user requests an HTML or other SGML page over a network which the web navigation application 300 converts into a file suitable for audio output. In an alternate embodiment, the executable resource 300 is a script, or other software program, which includes code, parameters, and other information suitable for use in converting the first set of information 304 into a second set of information 306 without the use of a document page 302. For example, the user request a web page over a network, and a script or procedure 301 includes filtering information to convert the web page to an intermediate file suitable for audio output without using an XML or other document page 302. The web navigation application 300 then converts the intermediate file into one or more audio output files which are transmitted to the user (e.g. by using an HTML file that refers to the audio output files and is provided by an application server 66 to a proxy browser 62 for playback to the user).

Figure 6:
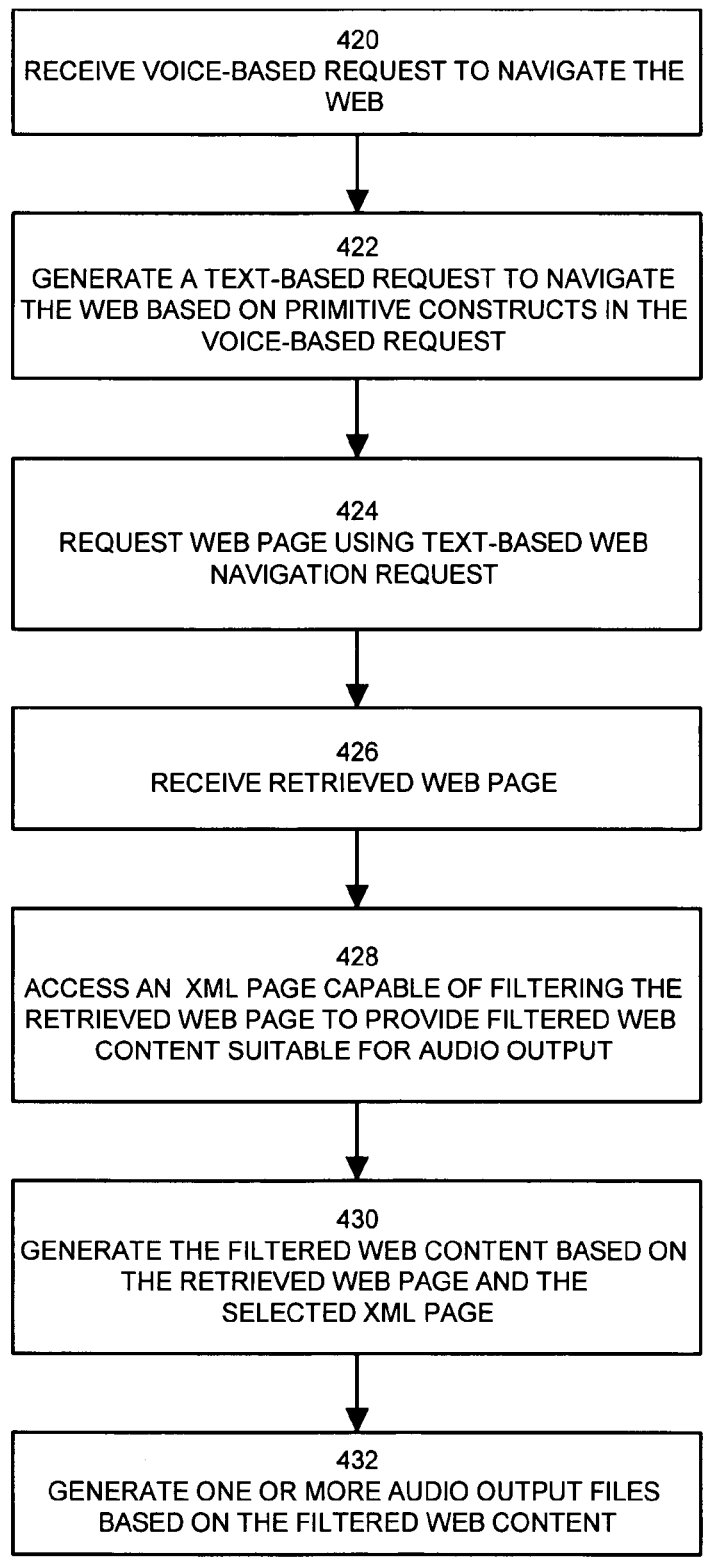
FIG. 6 is a flow chart of a process for navigating a web by voice, according to one embodiment of the invention.

FIG. 6 is a flow chart of a process for navigating a web by voice, according to one embodiment of the invention. The web navigation application 300 receives a voice-based request to navigate the web (step 420). In one embodiment, a user of an audio communication device, such as a cordless telephone 18a, facsimile machine with a handset 18b, analog telephone 18c, cellular telephone 18d provides the voice-based request in response to a menu generated by the tag implementation module 230 based on a specific application-defining document 307, such as an XML page, that provides the parameters, options, and other information for generation of an HTML document that is output from the application server 66 to the proxy browser 62. Thus, the voice-based request is associated with a specific application-defining document 307. In one embodiment, the web navigation application 300 identifies a particular user. For example, the user provides a user identification, such as a user identifier number, after dialing a number to call the application server 66. In one embodiment, a directory, such as the LDAP resource 242, stores personal data and class of data information on individual users, including preferential data on what web sites the user likes to browse and where the user likes to start. The web navigation application 300 retrieves the user's LDAP data 304d from the LDAP resource 242. The web navigation application 300 uses the LDAP data 304d to identify a suggested or selected web site for the user to browse, for example, in response to a verbal command such as "start," "explore," "browse," or other command. The web navigation application 300 then generates a text-based request to navigate the web based on primitive constructs in the voice-based request (step 422). The web navigation application 300 searches for primitive constructs in the voice-based request and constructs the text-based request based on the primitive constructs identified from the voice-based request. For example, the primitive constructs can be "enter," "back," "next," "home," or "yahoo." In one embodiment, the primitive constructs are stored in a database (not shown) associated with the application server 66. In another embodiment, the primitive constructs are stored in a database (not shown) associated with the proxy server 62. In another example, the primitive constructs can be digits spoken or entered on a touch tone keypad. In one embodiment, the web navigation application 300 uses a case-logic approach to interpret the primitive constructs and determine what web navigation commands, URL, or other information should be included in the text-based request.

The web navigation application 300 then requests the web page using the text-based web navigation request (step 424). For example, the web navigation application 300 posts the generated URL to the web server 64 to execute the request for the web page. The web server 64 then locates the web page 304a and sends it to the application server 66. In one embodiment, the web server 64 is implemented on the same server computing system as the web navigation application 300. The web navigation application 300 then receives the retrieved web page 304a from the web server 64 (step 426). The web navigation application 300 then uses the application-defining document 307 associated with the voice-based request to access a filtering document page 302 from the application document database 96. The filtering document page 302 is capable of being used to filter the retrieved web page 304a to provide generated content 306a or filtered web content 306b suitable for audio output (step 428). For example, the filtering document page 302 includes identifiers and other information that identifies the parts of the retrieved web page 304a the user is interested in and which are also suitable for conversion to audio output, such as the text for stock quotes from a web page 304a providing the stock quote text, other text, and/or graphics information. In one embodiment, the web navigation application 300 accesses the document page 302 based on an identity of the request. The identity may be based on the identifier of the originator of the request, such as the user's phone number, and/or based on an identity of the destination of the request, such as the URL provided in the request or from another source, such as an LDAP resource 242. In one embodiment, the web navigation application 300 accesses the document page 302 concurrently with sending out the request for the web page. That is, steps 424 and 428 may occur in a substantially concurrent time frame. In a time frame of nanoseconds or microseconds, the processing of the two steps 424 and 428 by a computer processor would be sequential, but in a longer time frame, such as a time frame of milliseconds or seconds, the two steps, 424 and 428, occur substantially concurrently.

The web navigation application 300 then generates the converted or filtered web content 306b from the retrieved web page 304a and the filtering document page 302 indicated by the application-defining document 307 associated with the voice-based request (step 430). The web navigation application 300 then generates one or more audio output files based on the filtered web content 306b (step 432). In one embodiment, the web navigation application 300 uses a text-to-speech (TTS) technique to convert the text in the filtered web content 306b to one or more audio output files. In another embodiment, the application server 66 sends the filtered web content 306b in an HTML page to an intermediary, such as the proxy browser 62, which generates the audio output (i.e., generates signals which the user device can convert to audible sound) and then sends the signals to the user via a connection (e.g. telephony connection) from the proxy browser 62 to an audio communication device.

In one example of using the web navigation application 300, the user could say "hotlist" or "bookmarks" to get a list of favorite web sites. Based on a reference from an application-defining document 307, the web navigation application 300 selects a document or file that includes the user's hotlist. The web navigation application 300 returns a list of text labels from the document or file to the proxy browser 62, which converts the text labels to audio output signals and provides (e.g. plays) the audio list of hotlist items to the user of a telephony device. For example, the user hears an audio list such as "for yahoo say 1, for stock quote say 2 . . . " The web navigation application 300 could also allow a user to add new web sites to the hotlist, for example, based on a command to "add hotlist." Alternatively, the hotlist information may be stored in a directory, such as an LDAP resource 242 that includes personal information for the user (see description below). The web navigation application 300 obtains the information 304d for the hotlist from the LDAP resource 242, dynamically create a document page 307 that provides a list of the hotlist items, which is then used to provide generated content or list of information 306. The web navigation application 300 can also obtain information 304c from a message service, such as IMAP 240, or information 304e from a mail service, such as SMTP 244.

In another example, after using the primitive constructs to surf to a commercial web site, such as Yahoo!, the user can also request the web navigation application 300 to define a personalized command such as "stock quotes," meaning to get the user's stock quotes from a personalized stock quote page at the commercial web site. The applications server 66 determines the user's personalized web page at the commercial site, for example, by looking up the URL of the personalized web page based on the user's ID number or phone number in a table (not specifically shown in the figures) maintained in the LDAP resource 242 or another directory or database by the application server 66. The web navigation application 300 then maps the phrase or text "stock quotes" to the URL for the user's personalized stock quote page commercial web site. The web navigation application 300 can also change the personalize stock quote page at the user's request. For example, the user may request that a stock be added to his/her personalized stock quote page, with a command such as "add stock ZZZZ." The web navigation application 300 then provides a text request to the commercial site to update the personalized stock quote page to include the requested stock.

FIG. 7 is a diagram illustrating an example of an XML menu page 500 providing a menu to the user of the audio web navigation application 300 according to one embodiment of the invention. The XML menu page 500 includes a menu variables section 502 that includes menu variable names and values and an options section 504 that provides options in the menu that the web navigation application 300 provides to the user in an audio format. The options provide prompts, such as the prompt "Hear ZZZZ Stock Information" for the seventh option 506, indicating that the user can hear stock quote information for the ZZZZ company. If the user presses "7" on a touch tone keypad of the telephony device that he/she is using, or says "7", then the application server 66 executes the readstock 530 service API or script, as described in FIG. 8. Readstock 530 is also referred to as a and is one example of the web navigation procedures 301.

FIG. 8. is a diagram illustrating, as an example only, a readstock script 530 that extracts text for a stock quote from a web page 304a and produces one or more audio output files. The readstock script 530 is an example of one script that can be used in conjunction with the XML menu page 500 shown in FIG. 7. The readstock procedure 530 includes a web page retrieval section 532, a string conversion section 534, a pattern searching section 536, a text output creation section 538, and an audio conversion section 540. The web page retrieval section 532 obtains a web page 304a from a web site based on an input parameter, which is "ZZZZ" in this example, indicating what stock quote the user wants. The input parameter is passed to readstock 530 from the XML menu 500 as the input parameter shown in the seventh option 506. The string conversion section 534 reads the return value from "stock_url" from the web page retrieval section 532 into a string, labeled "content," representing the web page 304a. The pattern searching section 536 searches the string using regular expressions, as is known in the art, for a known pattern that will locate the stock quote information. The text output creation section 538 creates a text output that includes the stock quote information. The audio conversion section 540 generates a .wav audio output file from the text composed in the text output creation section 538 using a TTS technique, as indicated by the TTS function "tts_stringtowav".

The readstock procedure 530 shown here is adapted for a specific stock quote web site, and another procedure 301 may need to be written to obtain a stock quote from another stock quote web site. A procedure 301, generally similar to readstock 530, extracts information from another type of web site, such as a weather web site, based on search patterns appropriate for a weather web page from that web site. In one embodiment, the techniques of the invention allow web navigation procedures 301 to be created different web sites.

In another embodiment, the readstock procedure 530, and similar procedures 301, identify hypertext links and HTML headings in an HTML page 304b received by the application server 66 in response to a user's request. A more generic procedure or search engine, generally derived from the readstock procedure 530, obtains search patterns from pattern-defining source, such as from pattern-defining files, databases, or other sources. FIG. 9 (described below) illustrates one example of such a pattern-defining file, shown as a sample filtering XML page 550, which is one example of a filtering document 302. The search patterns define how to filter the content of an incoming page or set of information 304. The search engine pattern set includes expected patterns for the HTML input page 304b as well as the expected layout of the results. In another embodiment, a generic set of filtering procedures or API's are able to describe any kind of page or set of information 304 to a nonvisual user of the web navigation application 300 including the generic set of filtering procedures.

FIG. 9 is a diagram illustrating, as an example, a filtering XML page 550 providing parameters used to extract text from an HTML page 304b. The filtering XML page 550 includes a search tag 552, a search string 554, a extract tag 556, and an extract parameter 558. In operation, the user enters a verbal command, such as "Get today's weather." In one embodiment, a weather service API, which is a web navigation procedure 301, locates an appropriate (e.g. predefined) URL for a weather web site from an XML page, an LDAP resource 242, database, or other source. The weather service API obtains an HTML page 304b from the weather web site and then accesses a filtering XML document 302 that can be used to extract weather information text from the HTML page 304b. The search tag 552 indicates a search string 554 for the weather service API to use in locating text for today's weather. The "<H2>" in the search string 554 indicates an HTML level 2 heading tag in the HTML file. The extract tag 556 indicates a parameter 558 for the weather service API to use in extracting the text from the HTML page 304*b*. The parameter 558 indicates to extract text from the line just after the search string 554 in the HTML page 304*b* up to the next level 2 heading indicated by the next instance of the "<H2>" tag in the HTML page 304*b*. Depending on the layout of the HTML page, 304*b* another type of extract parameter 558 could be used, such as NEXT_TEN_LINES, which would indicate that the weather service API should extract the next 10 text lines of text in the HTML page 304*b* after the search string 554.

While this invention has been particularly shown and described with references to preferred embodiments thereof, it will be understood by those skilled in the art that various changes in form and details may be made therein without departing from the spirit and scope of the invention as defined by the appended claims.

For example, the web navigation application 300 can use an ASR technique to process the incoming voice-based request to produce a text-based request. Alternatively, the proxy browser 62 receives the voice-based request to navigate the web from a connection to an audio communication device, converts voice-based request into a text-based request, and sends the text-based request to the application server 66. In general, either one of the ASR and TTS techniques can be performed in either the proxy browser 62 or the application server 66. For example, the ASR technique to translate audio input into text can be performed in the proxy browser 62 and the TTS technique to translate the generated output text into speech can be performed in the application server 66.

What is claimed is:

1. A method for providing information suitable for audio output comprising:
   receiving a first request, comprising a Uniform Resource Locator (URL);
   receiving an application defining document associated with a tagged document, the application defining document including a first set of information, based on the first request for the first set of information;
   accessing the tagged document in response to receiving the first set of information, the tagged document defined as an XML filtering document for filtering the first set of information;
   selecting, based on predetermined expected patterns in the tagged document, at least one portion of the first set of information that is suitable for audio output;
   generating a second set of information suitable for audio output based on selecting the at least one portion of the first set of information and the tagged document;
   receiving a voice request to perform web navigation in response to a menu generated based on the second set of information and a specific application-defining document that contains, collected from the user, user-customized commands;
   wherein the user-customized commands are used to select websites for the user to browse;
   wherein the menu identifies a plurality of user-customized commands;
   wherein the method is performed by one or more processors.

2. The method of claim 1, wherein receiving the first set of information based on a request for the first set of information comprises the steps of:
   receiving speech information specifying the first set of information;
   generating a text request for the first set of information based on an acoustic speech recognition (ASR) technique applied to the speech information; and
   submitting the text request over the network.

3. The method of claim 2, wherein the step of generating the text request comprises interpreting at least one primitive construct based on the speech information.

4. The method of claim 3, further comprising the step of generating at least one additional primitive construct based on a request for a user-defined command.

5. The method of claim 3, wherein:
   receiving the first set of information comprises receiving a web page based on a Uniform Resource Locator (URL) request for the web page;
   accessing the tagged document comprises accessing an Extensible Markup Language (XML) document; and
   generating the second set of information comprises generating filtered web content suitable for audio output based on the web page and the XML document.

6. The method of claim 5, wherein the step of generating the text request comprises applying a case-logic technique to the speech information.

7. The method of claim 1, wherein the step of accessing the tagged document in response to receiving the first set of information comprises:
   determining an identity of the request for the first set of information; and
   accessing the tagged document based on the identity of the request.

8. The method of claim 7, wherein the identity of the request is based on at least one of an identifier for an originator of the request and an identifier for a destination of the request.

9. The method of claim 1, wherein the step of generating the second set of information suitable for audio output comprises:
   selecting at least one portion of the first set of information that is suitable for audio output; and
   generating the second set of information based on selecting the at least one portion of the first set of information.

10. The method of claim 9, wherein the step of generating the second set of information suitable for audio output comprises:
    generating text data suitable for audio output based on the first set of information and the tagged document; and
    generating audio data based on the text data.

11. The method of claim 10, wherein the step of generating the text data suitable for audio output comprises generating at least one response and the step of generating the audio data based on the text data comprises applying a text-to-speech (TTS) technique to the at least one response.

12. The method of claim 11, wherein the step of accessing the tagged document is performed based on the request for the first set of information and concurrently with the step of receiving the first set of information.

13. The method of claim 12, wherein each of the first set of information, the tagged document, and the second set of information is at least one of a Hypertext Markup Language (HTML) page, an Extensible Markup Language (XML) page, a Virtual Reality Modeling Language (VRML) page, and a Standard Generic Markup Language (SGML) page.

14. A system for providing information suitable for audio output, the system comprising:
    one or more hardware processors;
    a document database configured for storing a plurality of tagged documents; and a server comprising an executable resource, wherein the executable resource is operable to:
    receive a first request, comprising a Uniform Resource Locator (URL);
receive a first set of information over a network based on a the first request for the first set of information;
    access a tagged document from the document database based on receiving the first set of information, the tagged document defined as an XML filtering document for filtering the first set of information;
    select, based on predetermined expected patterns in the tagged document, at least one portion of the first set of information that is suitable for audio output; and
    generate the second set of information suitable for audio output based on the selected portion of the first set of information and the tagged document;
    receiving a voice request to perform web navigation in response to a menu generated based on the second set of information and a specific application-defining document that contains, collected from the user, a-user identification-customized commands:
    wherein the user customized commands is are used to select websites for the user to browse;
    wherein the menu identifies a plurality of the user customized commands.

15. The system of claim 14, wherein the first set of information is a web page based on a Uniform Resource Locator (URL) request for the web page; the tagged document is an Extensible Markup Language (XML) document; and the second set of information is filtered web content suitable for audio output based on the web page and the XML document.

16. The system of claim 14, wherein the executable resource:
    receives speech information specifying the first set of information; generates a text
    request for the first set of information based on an acoustic speech recognition (ASR) technique applied to the speech information; and submits
    the text request over the network.

17. The system of claim 16, wherein the executable resource interprets at least one primitive construct based on the speech information, and further generates at least one additional primitive construct based on a request for a user-defined command.

18. A computer program product having computer program code encoded as a set of processor based instructions on a non-transitory computer readable storage medium for performing for voice-based navigation in a server configured to execute voice web applications comprising:
    receiving a first request, comprising a Uniform resource Locator (URL);
    requesting a web page using a text-based web request by posting the user-provided URL to a web server to execute the first request for the web page, the text based request operable to navigate the web and identify the requested web page;
    receiving the requested web page from the web server;
    accessing a filtering document page from an application document database using an application-defining document associated with the voice-based request, the filtering document page employing a markup language and operable to filter the retrieved web page to provide generated content suitable for audio output, the requesting the web page and accessing the filtering document occurring in a substantially concurrent time frame;
    generating the filtered web content from the retrieved web page and the filtering document page indicated by the application-defining document associated with the voice-based request;
    generating at least one audio output file based on the filtered web content via a text-to-speech (TTS) technique operable to convert the text in the filtered web content to audio output files; and
    sending the signals via a network connection to the user audio communication device;
    receiving a voice request to perform web navigation in response to a menu generated based on the second set of information and a specific application-defining document that contains, collected from the user, user customized commands;
    wherein the user customized commands are used to select websites for the user to browse;
    wherein the menu identifies a plurality of the user customized commands.

19. The computer program product of claim 18, wherein the non-transitory computer readable storage medium further comprises instructions, which when executed, cause:
    associating the voice-based request with the specific application-defining document;
    searching for primitive constructs in the voice-based request;
    constructing a text-based request based on the primitive constructs identified from the voice-based request; and
    generating the text-based request to navigate the web based on the primitive constructs in the voice-based request from at least one of a database and a proxy server.

20. The computer program product of claim 19 wherein the voice based request is operative to identify the particular user via the user identifier number indicative of an LDAP resource having personal data and class of data information on individual users.

21. The computer program product of claim 20 wherein a web navigation application uses a case-match approach to interpret the primitive constructs and determine web navigation commands are included in the text-based request.

22. The computer program product of claim 21, wherein the non-transitory computer readable storage medium further comprises instructions, which when executed, cause sending the filtered web content in an HTML page to an intermediary proxy browser operable to generate signals which the user audio communication device converts to audible sound.

* * * * *

UNITED STATES PATENT AND TRADEMARK OFFICE
CERTIFICATE OF CORRECTION

| | | |
|---|---|---|
| PATENT NO. | : 8,032,577 B2 | Page 1 of 1 |
| APPLICATION NO. | : 11/799851 | |
| DATED | : October 4, 2011 | |
| INVENTOR(S) | : Ryan A. Danner et al. | |

It is certified that error appears in the above-identified patent and that said Letters Patent is hereby corrected as shown below:

In the claims:

Claim 14, column 21, line 5, Delete "a" after --on--.

Claim 14, column 21, line 20, Delete "a-"

Claim 14, column 21, line 20, Delete "identification"

Claim 14, column 21, line 21, Delete ":" and insert --;--

Claim 14, column 21, line 22 Delete "user customized commands is" and insert --user-customized commands--

Claim 14, column 21, line 24 Delete "user customized" and insert --user-customized--

Claim 18, column 22, line 23, Delete "user customized" and insert --user-customized--

Claim 18, column 22, line 25, Delete "user customized" and insert --user-customized--

Signed and Sealed this
Twenty-second Day of November, 2011

David J. Kappos
*Director of the United States Patent and Trademark Office*